Jan. 31, 1961
D. R. HOLLS
2,970,290
FRONT FENDER TURN INDICATOR LAMP
Filed Aug. 7, 1959
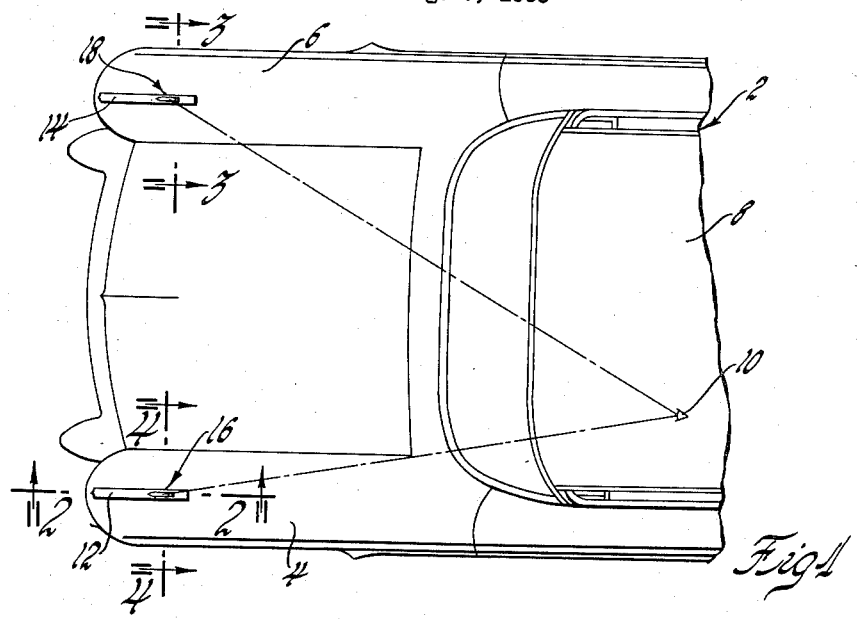
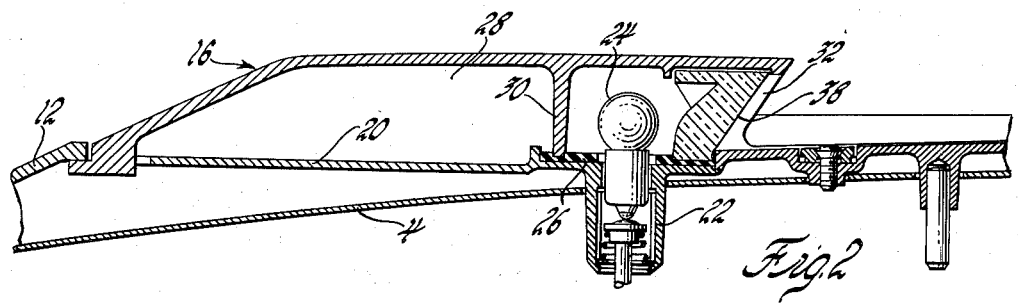
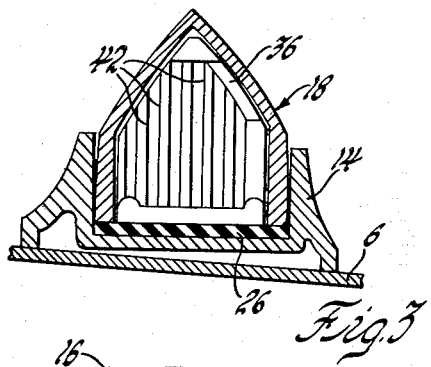
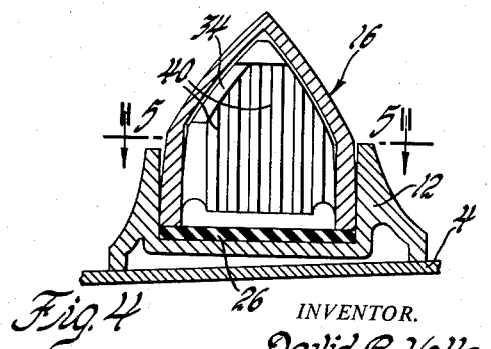
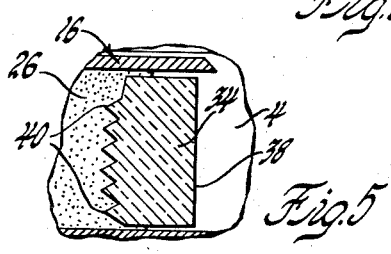
INVENTOR.
David R. Holls
BY
G. E. McGlynn Jr.
ATTORNEY

United States Patent Office

2,970,290
FRONT FENDER TURN INDICATOR LAMP

David R. Holls, Warren, Mich., assignor to General Motors Corporation, Detroit, Mich., a corporation of Delaware Filed Aug. 7, 1959, Ser. No. 832,251

2 Claims. (Cl. 340—85)

This invention pertains to turn signal indicator lamp assemblies and, more particularly, to a pair or set of such assemblies mounted on an automotive vehicle exteriorly of the vehicle passenger compartment to provide easy and optimum perception by the vehicle operator of turn signal operation while additionally providing a means of warning the operator of a vehicle passing from the rear that the vehicle being passed intends to make a turn.

As is well known, it is conventional practice to equip the front and rear of passenger cars and other over-the-road vehicles with left and right turn signal lamp assemblies. Additionally, a left and right side tell-tale or indicator lamp has been included on the vehicle instrument panel to indicate when and in what manner the turn signals are operating. For various reasons, including the great number of dials, switch buttons, signal lamps and the like now clustered upon modern vehicle instrument panels and, in many instances, the low range of audibility of operation of the turn signal switch, some vehicle operators have encountered the problem of not readily realizing from the indicator lamp the direction in which a turn is being signalled, or that a signal has not been cancelled following a turn. Additionally, accidents frequently occur because a trailing vehicle attempts to pass and comes alongside a vehicle which then signals a turn in the direction of the passing vehicle unknown to the operator of the latter because the conventional front and rear signal lamp assemblies are not in the view of the operator of the trailing or passing vehicle.

It is, therefore, a principal object and feature of this invention to provide a turn signal lamp assembly arrangement adapted to be mounted on an automotive vehicle exteriorly of the passenger compartment thereof so as to provide optimum and ready perception of turn signal operation by the vehicle operator.

It is yet another object and feature of this invention to provide a turn signal lamp assembly of the type aforementioned which has the dual function of, first, indicating turn signal operation to the vehicle operator while, secondly, providing a means for warning the operator of a vehicle alongside that a turn in his direction is being contemplated.

In general, these and other objects of this invention are attained by mounting on the front fenders of a conventional automotive passenger car or other over-the-road vehicle a pair of turn signal indicator lamp assemblies including, in particular, lenses of particular different optical configuration to project a selected portion of the light rays generated by the respective lamp sources directly toward the vehicle operator's station located as it is to one side of the longitudinal axis of the vehicle. The indicator lamp assemblies are so constructed and arranged as to block light which otherwise would pass directly forwardly of the vehicle, while additionally being viewable by the operator of a vehicle passing alongside.

These and other objects of this invention will become more apparent hereinafter as the description proceeds, and in which reference is made to the following drawings in which:

Figure 1 is a fragmentary plan view of a vehicle equipped with indicator lamp assemblies according to the present invention;

Figure 2 is an enlarged sectional view taken on line 2—2 of Figure 1 showing the left turn signal indicator lamp assembly;

Figure 3 is an enlarged sectional view taken on line 3—3 of Figure 1 showing certain details of the right turn signal indicator lamp assembly;

Figure 4 is an enlarged sectional view taken on line 1—1 similarly showing details of the left turn signal indicator lamp assembly; and Figure 5 is a sectional view taken on line 5—5 of Figure 4.

Referring now to the drawings, the numeral 2 indicates a conventional automotive passenger car vehicle comprising left and right front fenders 4 and 6, respectively, and a passenger compartment 8 including an operator's station corresponding to the driver's seat to one side of the longitudinal axis of the vehicle. Inasmuch as the vehicle shown in Figure 1 of the drawings represents one of the left-hand drive variety as manufactured domestically, the operator's station is shown on the left side of the vehicle with the operator's eye indicated at 10. It will be readily appreciated that, according to conventional practice, the front and rear of the vehicle are equipped with left and right turn signal lamp assemblies. It will also be understood that the vehicle is equipped with a suitable type of turn signal operating mechanism operable manually by the vehicle operator to cause the left front and rear or right front and rear turn signal lamp assemblies to flash intermittently in order to signal a turn. If desired, the instrument panel of the vehicle may be equipped with left and right turn signal tell-tale or indicator lights as is conventional practice but, as will appear hereinafter, the turn signal indicator lamp assemblies to be described fully perform the function of these prior tell-tale lights.

The longitudinally extending ornamental crown moldings 12 and 14 are mounted symmetrically on top of the left and right front vehicle fenders 4 and 6, respectively, substantially equidistantly from the longitudinal axis of the vehicle, and include the left and right turn signal indicator lamp assemblies 16 and 18, respectively. Inasmuch as the respective indicator assemblies 16 and 18 are substantially identical except for the particular lenses employed therein, a description of the left lamp assembly with respect to Figure 2 will suffice to explain the general constructional details of each lamp assembly.

The left lamp assembly 16 comprises a longitudinally extending body element 20 which is part of the crown molding 12, and which includes an integral vertically upstanding and opening socket construction 22 which may be of conventional design and extends through a suitable aperture in the left fender 4. A suitable light source such as a conventional light bulb 24 is adapted to be removably secured within the socket construction 22 in a manner well known in the art. A suitable gasket 26 is seated about the opening in the socket construction 22, and a lamp housing 28 preferably of ornamental design is secured to the crown molding 12 with the downwardly projecting rib 30 seated against the gasket 26. The housing construction completely encloses the bulb 24 except for a housing opening 32 rearwardly of the bulb. As a result of this construction, light rays from the bulb are prevented from projecting forwardly of the vehicle.

With respect to an examination of Figures 3 and 4, it will be seen that the roofs of the housings of the respective left and right indicator assemblies 16 and 18 slope downwardly from the center thereof in generally V-shaped configuration to merge with side walls respectively seated against the gaskets within the U-shaped channel of the respective crown moldings 12 and 14. The openings 32 in the rearward portions of the respective housings receive the left and right lenses 34 and 36, respectively.

Each of the lenses 34 and 36 is particularly and individually designed for the left and right indicator lamp assemblies respectively. The left and right lenses include rearwardly presented faces as indicated at 38 relative to the left assembly and inner faces including suitable optical elements or flues 40 and 42 to direct light rearwardly in a particular manner. More particularly, as indicated in Figures 1 and 2 of the drawings, the left lens 34 is specifically designed to bend selected light rays inwardly and upwardly at a predetermined angle relative to the longitudinal axis of the vehicle for optimum perception by the eye 10 of the vehicle operator. In similar fashion, the lens 36 of the right indicator lamp assembly is specifically designed to bend selected portions of the light rays therefrom inwardly and upwardly at another predetermined angle, larger than the aforementioned angle of the left lamp assembly, for optimum perception by the vehicle operator's eye. It will be readily apparent that the specific lens designs will depend upon such considerations as the location of the eye of an average driver and the relative locations of the average driver and the indicator lamp assemblies. By way of example, in one modern automotive vehicle equipped with the indicator lamp assemblies of this invention, it has been found convenient to design the left and right lamp lenses to bend light upwardly approximately 8 degrees with respect to a horizontal plane. Moreover, the lens of the left lamp has been designed to bend selected portions of the light rays therefrom inwardly approximately 10 degrees from a vertical plane through the longitudinal axis of the vehicle while bending similar light rays from the right indicator lamp inwardly in a plane approximately 30 degrees from a vertical plane through the longitudinal axis of the vehicle. In any particular installation, the result is optimum perception of the respective signals by the vehicle operator. At the same time, it will be realized that an operator of a vehicle passing alongside a vehicle equipped with the subject indicator lamps will be able to see the illuminated lens of an energized indicator lamp.

The operation of the lamps will be described with reference to the indicator lamp assembly 16 mounted on the left front fender. When a left turn is signalled by a conventional turn signal switch and circuit including a flasher unit, the turn signal lamps at the front and rear of the vehicle on the left side begin to flash in the usual manner. The flashing of the left side lights is indicated to the vehicle operator by light rays passing rearwardly, upwardly and inwardly through the left lens 34 to provide optimum perception by the vehicle operator as aforementioned. At the same time, the intermittently illuminated lens will serve to warn the operator of a vehicle alongside that a left turn is contemplated. No light is visible from the front of the vehicle. In a similar fashion, it will be appreciated that the right indicator lamp functions to the same end, but is provided with a different lens 36 to bend the indicating light at a greater angle for optimum perception by the vehicle operator.

While but one form of the invention has been selected for a descriptive illustration thereof, other forms will be apparent to those skilled in the art. Therefore, the embodiment shown in the drawing is merely for illustrative purposes, and is not intended to limit the scope of the invention which is defined by the claims which follow.

I claim:

1. In combination, a vehicle including a driver's seat to one side of the longitudinal axis of the vehicle, and a turn signal indicator lamp assembly mounted on each side of said vehicle substantially equidistantly from the longitudinal axis thereof and forwardly of said driver's seat; each of said assemblies comprising a light source, a housing for each of said sources blocking projection of light rays directly forwardly of said vehicle and including an opening rearwardly of said sources, a lens mounted in each of said openings, and a plurality of optical elements on the interior surfaces of the respective lenses receiving and directing selected portions of the light rays from the respective light sources upwardly above the horizontal and rearwardly and inwardly at different angles relative to the longitudinal axis of the vehicle and directly at the occupant of said driver's seat, and said lenses directing other light rays rearwardly and outwardly from said vehicle.

2. In combination, a vehicle including a driver's seat to one side of the longitudinal axis of the vehicle, left and right front fenders on each side of the longitudinal axis of the vehicle forwardly of said driver's seat, and left and right turn signal lamp indicator assemblies mounted respectively on top of said front fenders substantially equidistantly from the longitudinal axis of said vehicle; each of said assemblies comprising a socket construction mounted within a respective fender and opening upwardly therefrom, a light source mounted in and upstanding from each of said sockets, a housing for each of said light sources blocking projection of light rays directly forwardly of said vehicle and including an opening rearwardly of said sources, a lens mounted in each of said openings, and a plurality of optical elements on the interior surfaces of the respective lenses receiving and directing selected portions of the light rays from the respective light sources upwardly above the horizontal and rearwardly and inwardly at different angles relative to the longitudinal axis of the vehicle and directly at the occupant of said driver's seat, and said lenses directing other light rays rearwardly and outwardly from said vehicle.

References Cited in the file of this patent

UNITED STATES PATENTS

| | | |
|---|---|---|
| 1,617,720 | Morris | Feb. 15, 1927 |
| 1,972,090 | Getty | Sept. 4, 1934 |
| 2,002,503 | Foti | May 28, 1935 |
| 2,025,349 | Jabusch | Dec. 24, 1935 |
| 2,270,587 | Hall | Jan. 20, 1942 |